INVENTORS
JANE T. CAREY
ALFRED A. FRACCHIA
BY
*Roberts & Cohen*
ATTORNEYS

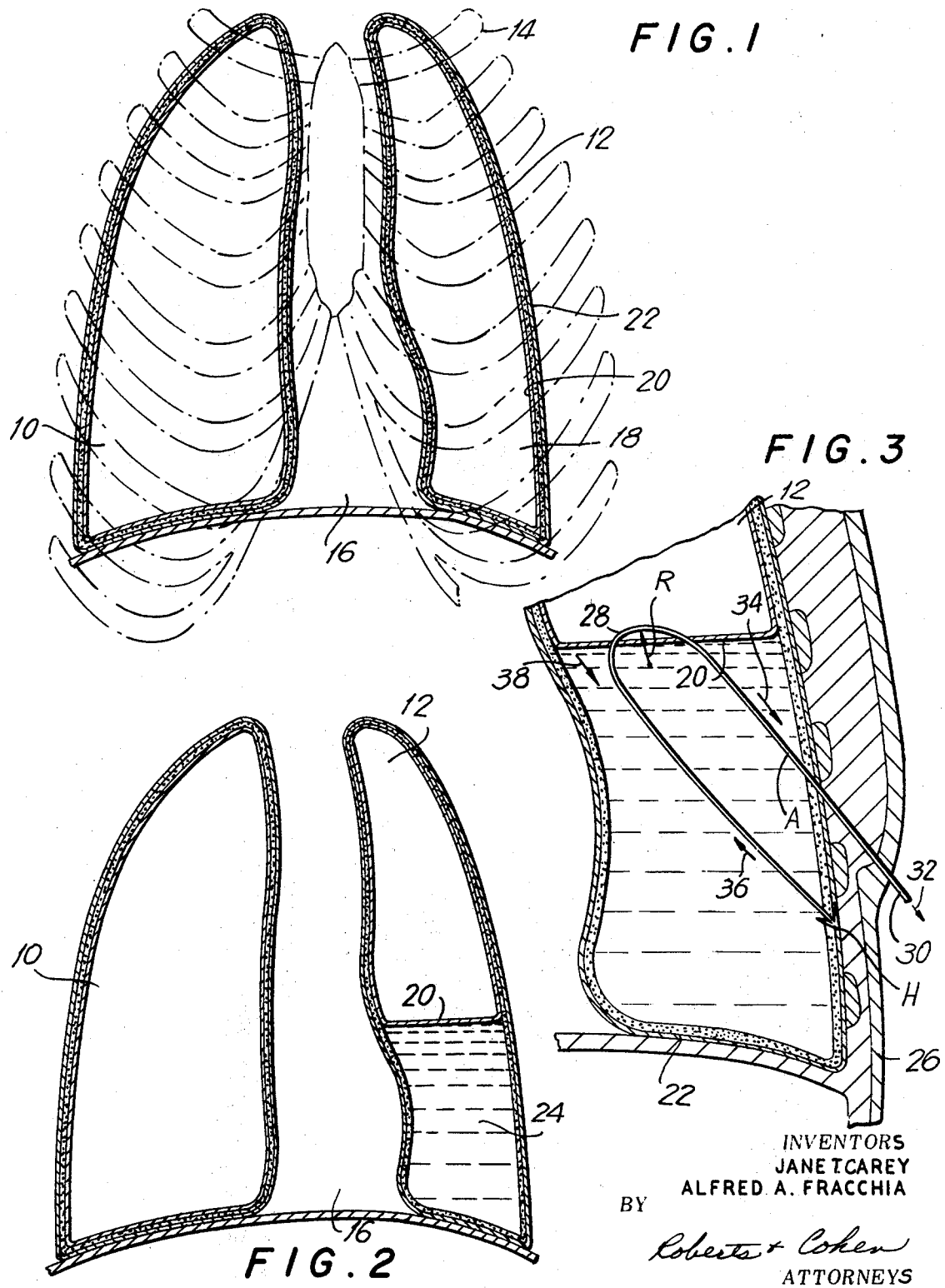

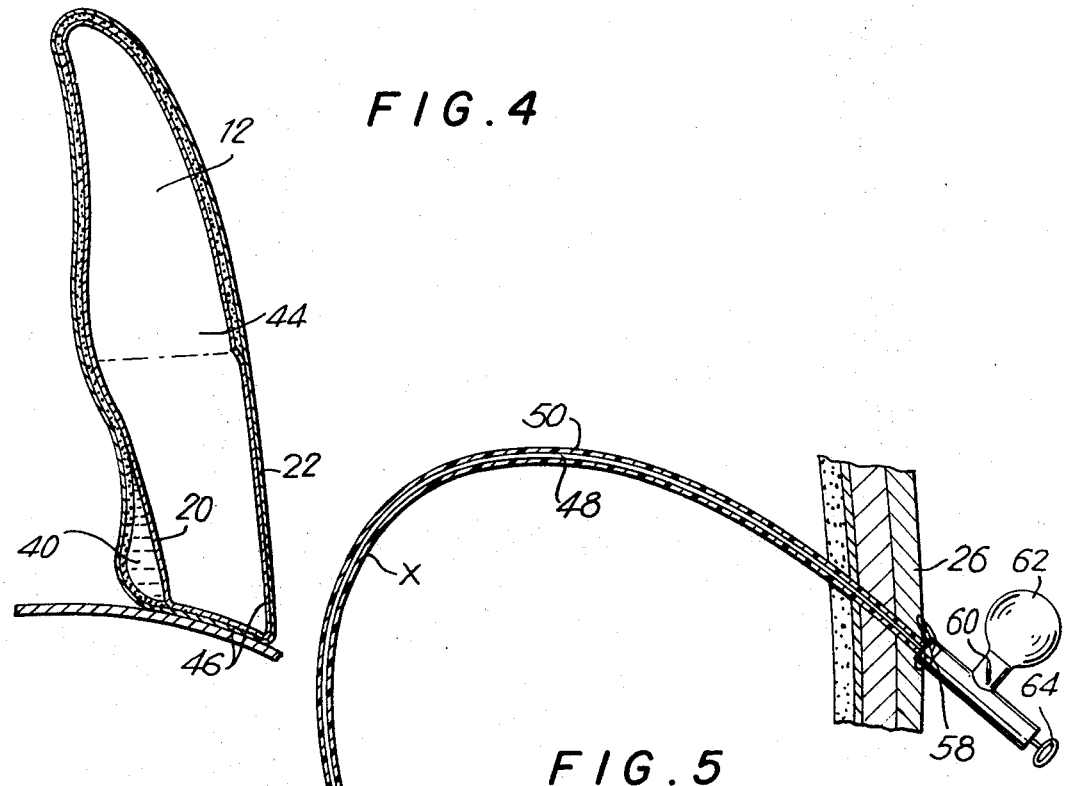

United States Patent Office 3,521,640
Patented July 28, 1970

3,521,640
SURGICAL APPARATUS FOR USE WITH A DISEASED LUNG OR THE LIKE AND RELATED METHOD
Jane T. Carey, 450 E. 63rd St., New York, N.Y. 10021, and Alfred A. Fracchia, Plandome, N.Y. (440 E. 63rd St., New York, N.Y. 10021)
Filed Dec. 7, 1967, Ser. No. 688,861
Int. Cl. A61b 17/00
U.S. Cl. 128—334     9 Claims

ABSTRACT OF THE DISCLOSURE

A surgical appliance capable of being inserted through the parietal pleura and through the visceral pleura of a lung and looped back and attached to the parietal pleura by means of a barb, and acting as a retractable loop to draw the viscera pleura against the parietal pleura to minimize a space developed therebetween as the result of an accumulation of fluid, and such that adhesions may develop between the pleurae to prevent the further accumulation of fluid. The appliance is, moreover, provided with features such that the barb can be concealed for withdrawal of the appliance.

DRAWING

FIG. 1 is a diagrammatic illustration of the chest viscera of a human body illustrating the arrangement and the disposition of a healthy pair of lungs;

FIG. 2 is a diagram similar to that of FIG. 1 illustrating a diseased lung in which fluid has accumulated between the visceral and parietal pleurae;

FIG. 3 is a diagram, on enlarged scale, of the fluid-filled portion of the lung of FIG. 2 showing how the appliance of the invention is utilized;

Figure 7:
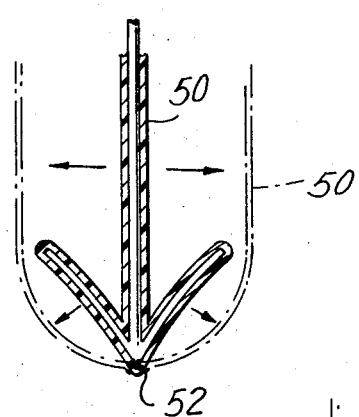
Figure 8:
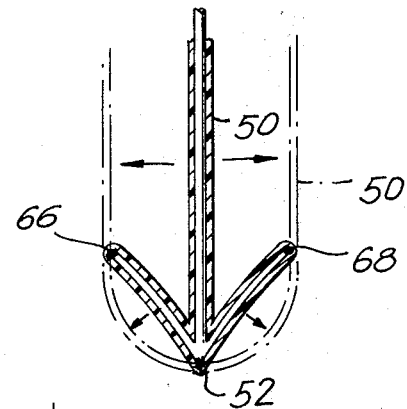
Figure 9:
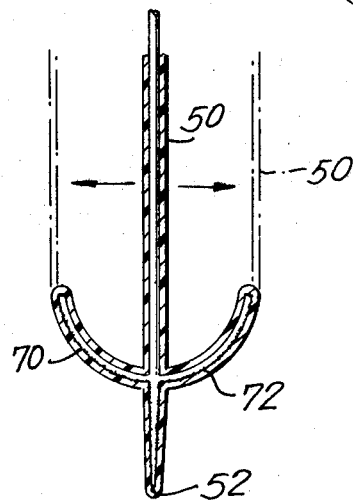

FIG. 4 diagrammatically illustrates the diseased lung after the appliance of the invention has been utilized and removed;

FIG. 5 diagrammatically illustrates a specific type of appliance provided in accordance with one embodiment of the invention;

FIG. 6 is a view similar to FIG. 5 illustrating how the barb structure is shielded for withdrawal of the appliance;

FIG. 7 diagrammatically illustrates the barbed end of the appliance in accordance with one particular construction;

FIG. 8 illustrates a variation of FIG. 7;

FIG. 9 illustrates a further variation of FIG. 7; and

Figure 10:
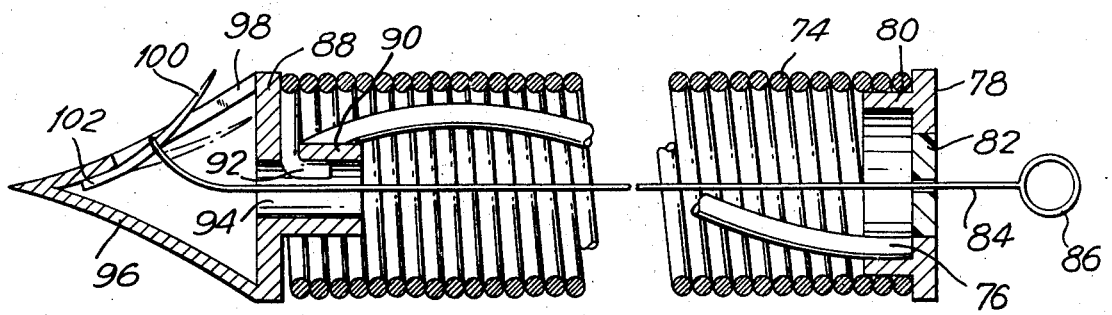

FIG. 10 illustrates a further type of appliance in accordance with another embodiment of the invention.

DETAILED DESCRIPTION

This invention relates to surgical appliances and techniques and more particularly to surgical appliances useful in the treatment of lungs and like physiological organs.

It is an object of the invention to provide an improved appliance for the treatment of lungs in which fluids or air have accumulated between the visceral and parietal pleurae.

It is another object of the invention to provide improved surgical appliances and techniques resulting in new and useful processes for the amelioration of the aforenoted type of condition.

Yet another object of the invention is to provide new and improved appliances enabling surgeons to treat lungs in such a manner as to promote the growth of adhesions between the visceral and parietal pleurae in order to prevent the accumulation of fluids therebetween.

To achieve the above and other of the objects of the invention, there is proposed in accordance with the invention, a method generally characterized by drawing the inner ad outer walls of a lung together to minimize the potential space in which fluids or air may accumulate, the invention further involving holding such walls together until a natural adhesion can take place. In the case in which the organ to be treated is a lung, the visceral and parietal pleurae will be held together, in accordance with the invention, by passing a wire-like member through the parietal pleura and then through the viscera pleura, whereafter the member is looped through a 180° turn and returned through the viscera pleura to the parietal pleura, which is then engaged by means of a barb or the like, whereafter the member is treated as a retractable loop, serving to draw the viscera pleura against the parietal pleura. This relationship is then maintained until natural adhesions have developed. Thereafter the apparatus is withdrawn, provision being made to conceal or shield the barb in such a manner that injury to the organ being treated does not occur.

As will be explained in greater detail, the appliance of the invention can, in accordance with one embodiment, be provided with a balloon-like member which is deflated upon insertion of the appliance and which for withdrawal is inflated in order to conceal and shield the barb. In accordance with another embodiment, the barb is retractably mounted with respect to an elongated member on which it is mounted so that upon insertion the barb is positioned for engaging the parietal pleura whereafter the barb is withdrawn into the elongated member for withdrawal of the appliance.

The above and other objects of the invention will be better understood from the following detailed description considered in conjunction with the accompanying drawing, the specific figures of which have been enumerated above.

In FIG. 1 appear lungs 10 and 12 shielded by a cage consisting of ribs 14 and between which is located the heart cavity 16. As is well known, each lung consists of lung substance 18 confined by a wall inclusive of the visceral pleura 20 and the parietal pleura 22. There is normally a potential space between the viscera and parietal pleurae filled with a small amount of serous pleural fluid.

In certain well known diseases, a fluid may accumulate between the pleurae as indicated at 24 (FIG. 2). This fluid will separate the visceral pleura 20 from the parietal pleura 22 and will ocupy a volume which will decrease that volume available for the normal respiratory function of the lung. If this fluid is withdrawn, it is found that the lung substance tends to expand towards its original volume.

As is diagrammatically illustrated in FIG. 3, in accordance with the invention, an appliance A is inserted through the skin and muscle 26 of the patient and is then caused to penetrate through the parietal pleura and visceral pleura in sequence whereafter, as indicated at 28, the appliance is turned through an approximately 180° loop and returned through the visceral pleura towards the parietal pleura, whereat the appliance is hooked into the parietal pleura such as at H by a barb or the like.

As is seen in FIG. 3, with the appliance installed as indicated above, the free extremity 30 of appliance A which remains protruding outside of the skin and muscle 26, is then retracted or withdrawn as indicated by arrow 32, the remainder of the appliance following as indicated by arrows 34 and 36. Appliance A thus constitutes a retractable loop which causes the visceral pleura 20 to be drawn towards the parietal pleura 22 as indicated by arrow 38. The fluid can be aspirated prior to or concomitant with this procedure.

The result is as generally shown in FIG. 4, in which the large volume previously occupied by the undesirable accumulation of fluid has been substantially reduced so that there remains a small potential space 40 which may perhaps be occupied by a re-accumulation of fluid. It follows as a natural consequence of the treatment indicated above that the lung substance 44 occupies a percentage volume relative to the maximum available which is large in comparison with the diseased and untreated lung illustrated in FIG. 2. It further occurs that when the appliance is retained in position for a period of time of, for example, two weeks, natural adhesions will develop between the pleurae such as indicated at 46 so that the appliance can ultimately be withdrawn following which the re-accumulation of fluid in those areas in which adhesions have developed is no longer possible despite the removal of the appliance.

Certain requirements must be respected with regard to a preferred embodiment of the invention. In particular, the appliance must be fabricated of a surgically acceptable or tolerable material as, for example, stainless steel, platinum, silver, or the like. It should be sheathed by a radio opaque plastic substance to enable the appliance to be followed under fluoroscopy during insertion. Moreover, the entire shaft of the appliance must be capable of being passed or looped through a 180° turn with a relatively small turning radius without undergoing permanent deformation. Referring in this regard to FIG. 3, it is seen that the turning radius shown at R is of relatively small dimension. Regarding the undergoing of permanent deformation, the appliance will preferably be such that a 180° turn or loop is possible with a radius of about 3 centimeters without a permanent set resulting in the appliance.

In addition to the above, the appliance will preferably be provided with a pointed end which will be of sufficient rigidity as to enable penetration through skin, fascia, muscle tissue, lung substance and the lung pleurae without the appliance's undergoing a deformation which will prevent the aforedescribed technique from being practiced.

A further requirement of the appliance is that it be of such dimension that when forces are applied thereto as shown in FIG. 3, the appliance will not act as a knife-edge which will readily cut through the pleurae and other lung substance.

Where the appliance is made in the form of a wire-like member, it will have, for example, a diameter of about three to fifteen-thousandths of an inch. Since the surgical technique involved will permit the appliance to be urged through the lung substantially by the use of surgical forceps and like instruments, this diameter will supply sufficient rigidity to enable penetration without undue deformation.

FIG. 5 illustrates the appliance A in the form of a wire-like member 48 encompassed by a ballon-like radio opaque plastic sheath 50. The member 48 has a pointed end 52 and two barbs 54 and 56. The overall length of the appliance is a minimum of about eight inches to permit the looping around of the appliance after it has been passed through the visceral pleura, while at the same time permitting a portion of the appliance to remain outside of the body for manipulation. The appliance in FIG. 5 is illustrated as having been passed through the skin 26 with suturing 58 being provided to hold the inserted appliance in position. The ballon-like component 50 extends outside of the body and is connected with a tube 60 leading to a bulb 62 which subsequently enables the inflation of the ballon-like member 50 for withdrawal. The wire-like member 58 is provided with an end loop 64 to facilitate withdrawal of the appliance.

The ballon-like member 50 is a tubular deflatable or collapsible component fabricated of a radio opaque plastic film. This film must remain in situ in the body while resisting deterioration therein. The plastic film, it will be appreciated, must have sufficient tear strength so as to resist penetration of the barb or barbs as these are brought into engagement with the parietal pleura in addition to having a property of pliability such that it will not act as a knife edge which will tear the lung substance or pleurae. Because Teflon (polytetrafluoroethylene possesses these properties, it is the preferred material. Other surgically acceptable plastics may be used if they have the aforesaid characteristics.

As illustrated in FIG. 6, the bulb 62 is subsequently employed to inflate the balloon-like member 50 so that the barbs 54 and 56 are completely concealed or shielded. This enables the withdrawal of the appliance without damage to the lung substance by the barbs.

FIG. 7 illustrates the particular case in which the balloon-like member 50 is fused at a single point to the end 52, the inflated disposition of the balloon-like member being indicated in doted lines. In this case, upon inflation the member 50 will remain attached to the pointed end 52 but will in all other areas be separate therefrom.

FIG. 8 illustrates a triple fusion of the balloon-like member 50 at points 66 and 68 in addition to pointed end 52. In this case, upon inflation the balloon-like member will remain attached at these points but will be separate from the wire-like member at all other areas.

FIG. 9 illustrates an anchor-type extremity in which the pointed end 52 extends through the balloon but in which the barbs are arcuate and in which further the balloon is fused to the barbs along lines 70 and 72. The attachment between the balloon-like member and the wire-like member where required can be provided, for example, by the use of adhesives. Epoxy and phenoxy resins may be employed, but phenolic resins are particularly useful as they are capable of resisting fungus and moisture.

Besides the balloon-type of structure referred to above, other types of structures are also possible within the scope of the invention. One such structure is illustrated in FIG. 10 wherein the elongated part of the appliance is formed of a tightly wound spiral 74 of surgically acceptable metal, the spiral 74 encircling a wound spiral 76 of ribbon or wire which is wound in a coil having a substantially greater pitch than that which characterizes coil 74. This combination of coils results in a flexible member permitting the looping indicated above which at the same time has sufficient compression strength and resistance to undesired flexure as has been discussed above. At one end of this elongated member is positioned a disc 78 having a circular flange 80 on which coil 74 is mounted. A bushing 82 of nylon or the like is centrally mounted in disc 78 and is provided with a pin-point opening through which passes a wire 84 having a loop 86 at the end thereof.

At the other end of coil 74 is provided a disc 88 having a circular flange 90 accommodating the corresponding end of coil 74, one end of which is indicated at 92 as passing through a hole in flange 90 to hook onto this flange. Disc 88 is provided with an opening 94 through which wire 84 passes.

Mounted on disc 88 is a hollow conical member 96 constituting the pointed end of the appliance. This part is provided with a slot 98 through which normally extends a barb 100 fabricated of a resilient material fastened internally at end 102 to the member 96.

In the above construction barb 100 normally protrudes from the appliance and can be employed to hook into the parietal pleura of the lung, while coils 74 and 76 permit the type of manipulation of the appliance noted hereinabove. When the appliance is ready to be withdrawn, a traction on loop 86 will cause the withdrawal of barb 100 internally into member 96 so that the barb will be concealed and will not cause damage to the lung substance through which the appliance is withdrawn.

Appliances of the invention can be installed by various techniques including fluoroscopic techniques and for some of these techniques the appliances of the invention can be provided with radioactive substances to facilitate tracing the appliances during installation. The appliances as have been noted above can be installed with the use of forceps or the like to position the same with the degree of accuracy required.

There will now be obvious to those skilled in the art many modifications and variations of the structures and techniques described hereinabove. These modifications and variations will not depart from the scope of the invention as defined by the following claims.

What is claimed is:

1. A method for the treatment of a condition in which a material undesirably accumulates between the inner and outer walls of a physiological organ, said method comprising drawing the walls together to minimize the space in which said material can accumulate, and holding the walls together until a natural adhesion takes place, the organ being a lung the walls of which are the visceral pleura and the parietal pleura and the material accumulating therebetween being a fluid, said method further comprising passing a wire-like member through the parietal pleura, looping the member through the visceral pleura and hooking the member into the parietal pleura, and pulling on the member to draw the visceral pleura against the parietal pleura.

2. A method as claimed in claim 1 comprising unhooking the member from the parietal pleura after the parietal and visceral pleurae have adhered together and withdrawing the member.

3. A method as claimed in claim 2 wherein the member is unhooked by inflating a balloon around the member.

4. A method as claimed in claim 2 wherein the member has a barbed end and wherein the member is unhooked by withdrawing the barbs into the member.

5. A method as claimed in claim 2 comprising suturing the member in place while the parietal and visceral pleurae are adhering together.

6. Apparatus for the treatment of a condition in which a material undesirably accumulates between the inner and outer walls of a physiological organ, said apparatus comprising an elongated member of a length sufficient to be inserted through said outer wall into said organ and to be looped around the inner wall and to reach back to the outer wall, and means on the member to engage the outer wall thus enabling the walls to be drawn together to develop adhesions between one another; said member comprising a wire-like component including a pointed end, at least one barb on said component adjacent said end, and a balloon-like component sheathing said wire-like component and barb and being normally deflatable to permit insertion into said organ of the wire-like component and inflatable to conceal the barb and permit withdrawal of the wire-like member.

7. Apparatus as claimed in claim 6 comprising means coupled to the balloon-like component to inflate and deflate the same.

8. Apparatus as claimed in claim 6 comprising radiological detectible means associated with said member whereby the position of said member can be monitored.

9. Apparatus for the treatment of a condition in which a material undesirably accumulates between the inner and outer walls of a physiological organ, said apparatus comprising an elongated member of a length sufficient to be inserted through said outer wall into said organ and to be looped around the inner wall and to reach back to the outer wall, and means on the member to engage the outer wall thus enabling the walls to be drawn together to develop adhesions between one another; the elongated member being of a surgically tolerable metal having a minimum length of about eight inches and being adapted for being looped through a 180 degree turn in a turning radius of about three centimeters without undergoing permanent deformation, said member including a pointed end and being of sufficient rigidity as to enable penetration through lung and muscle tissue and fascia and long pleurae, said member having a diameter such as to avoid constituting a knife edge.

References Cited

UNITED STATES PATENTS

| | | | |
|---|---|---|---|
| 1,248,492 | 12/1917 | Hill | 128—347 |
| 2,001,638 | 5/1935 | Tornsjo | 128—347 |
| 2,108,206 | 2/1938 | Meeker | 128—353 |
| 2,788,787 | 4/1957 | Trace | 128—303 |
| 2,873,742 | 2/1959 | Shelden | 128—305 |
| 3,123,077 | 3/1964 | Alcamo | 128—335.5 |
| 3,308,819 | 3/1967 | Arp | 128—215 |

DALTON L. TRULUCK, Primary Examiner

U.S. Cl. X.R.

128—347